Jan. 19, 1960 D. M. YOUNG 2,921,795

SOUND RECORDING TAPES

Filed Sept. 15, 1955

INVENTOR
DANIEL M. YOUNG

BY Zoltan H. Polachek

ATTORNEY

United States Patent Office 2,921,795
Patented Jan. 19, 1960

2,921,795

SOUND RECORDING TAPES

Daniel M. Young, Roslyn Heights, N.Y.

Application September 15, 1955, Serial No. 534,431

2 Claims. (Cl. 274—43)

This invention relates to new and useful improvements in sound recording tapes for record players and sound recording and playing machines.

More particularly, the present invention proposes the construction of an improved permanent recording sound medium having all the advantages of both a tape and disc type phonograph record and with a recording that cannot be wiped off.

As a further object, the present invention proposes forming the tape with two superposed tapes having sound tracks with the sound engraved or otherwise impressed into them as on disc records and not magnetically and with different sound recordings on each tape such as music on one tape and words on the other; instrumental music and choral music, etc.

A further object of the invention proposes constructing the tapes for use as a double tape with spaced aligned sprocket openings along the sound tracks and spaced perforations in the tape covering the sound track of the other tape for separating portions of the covering tape from the covered tape to dispose the sound track on such tape so as to permit the user of the double tape to edit the tape so as to provide any composition and combination of the sound tracks of the two tapes which he desires.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
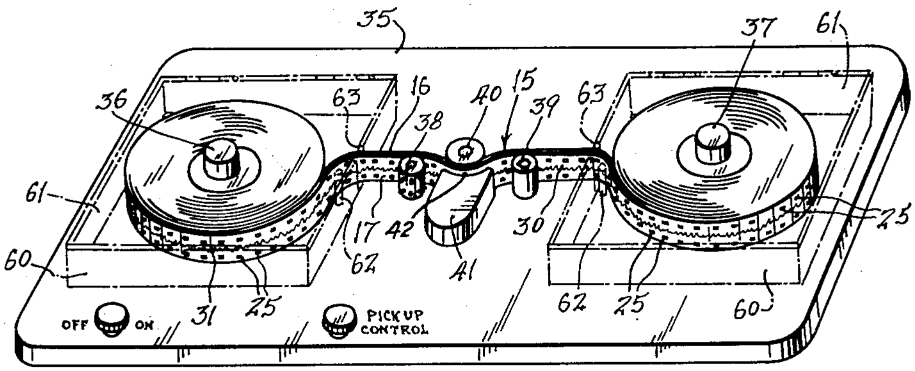
Fig. 1 is a perspective view of a record player with a tape constructed and arranged in accordance with the present invention.
Figure 2:
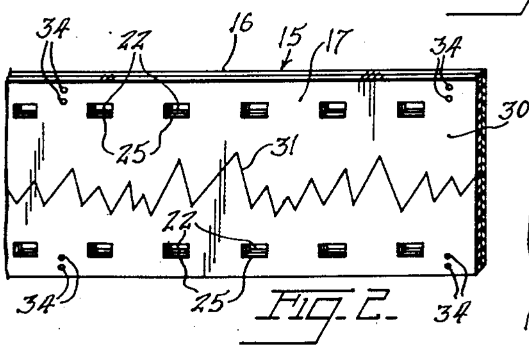
Fig. 2 is a fragmentary perspective view of a part of the tape shown in Fig. 1.
Figure 3:
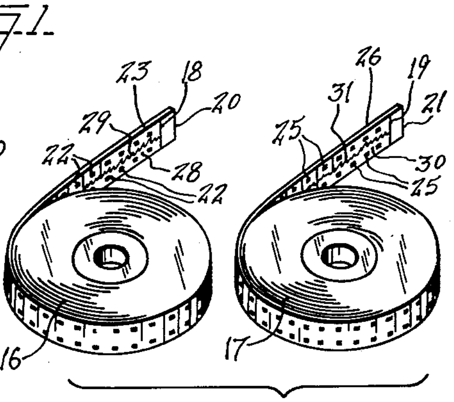
Fig. 3 is a perspective view of the double tape shown in Figs. 1 and 2 as originally formed in two separate rolls, as separate tapes.
Figure 4:
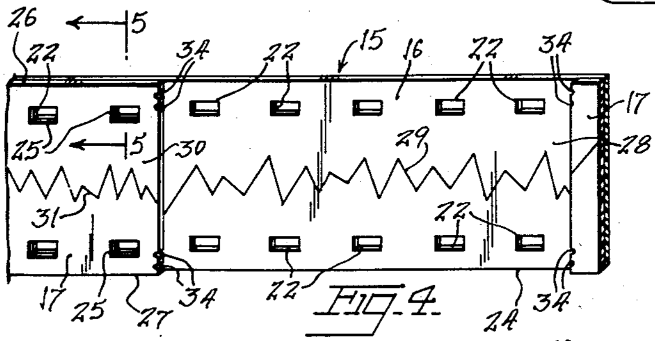
Fig. 4 is a view similar to Fig. 1 but with part of the covering tape removed.
Figure 5:
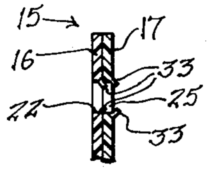
Fig. 5 is a sectional view taken on line 5—5 of Fig. 4.

Referring more particularly to the drawings, the permanent recording sound tape, in accordance with the first form of the invention illustrated in Figs. 1 to 5, inclusive, is designated generally by the reference numeral 15.

Tape 15 is a flexible double tape made up of two separate superposed tapes 16 and 17 which preferably are of thermoplastic material such as a vinyl plastic. The tapes 16 and 17 are identical in length and width and thickness. Starting marks 18 and 19 on the tapes 16 and 17 adjacent ends 20 and 21 provide convenient and easy means to align the tapes.

Tape 16 has a plurality of spaced sprocket openings 22 adjacent the side edges 23 and 24 of the tape, and tape 17 has like registering sprocket openings 25 along its side edges 26 and 27.

A sound track 28 is disposed between the sprocket openings 22 of tape 16 and sound is engraved or impressed in a groove 29 in the sound track as on a disc record rather than magnetically. The sound groove 29 is permanent.

On the covering tape 17 there is also a sound track 30, which is disposed between sprocket openings 25, and a permanent sound groove 31 is provided in the sound track. The sound grooves 29 in tape 16, the covered tape, contains a different sound recording than the groove 31 of tape 17, the covering tape. For example, groove 29 may record music and grooves 31 words, or groove 29 may be the recording of instrumental music and groove 31 of choral music.

One or both the tapes may be provided with small projecting portions 33 bordering the sprocket openings frictionally to fit into the sprocket openings of the other tape to interlock and hold the tapes together. The portions 33 may be formed simply by punching the sprocket openings.

The covering tape 17 has a plurality of spaced transversely disposed perforations 34 so that a person can remove portions of the covering tape 17 from the covered tape 16 and dispose portions of the sound track 28 merely by tearing the plastic tape along the perforations. In this manner the tape 15 can be edited as desired so as to provide any sequential combination of the two grooves 29, 31 to form one substantially continuous sound track.

The double tape 15 is initially formed by superposing the two separate tapes 16 and 17. The double tape is then edited as desired and when desired. The tape is played on a sound recorder such as recorder 35 shown in Fig. 1 having two spaced spindles 36 and 37, a guide sprocket 38, a roller 39, a sprocket capstan 40 and a sound pickup member 41 having a stylus 42 for following the sound track of the tape presented to the stylus.

As an example of use of the double tape 15, suppose that groove 29 contains recorder music while groove 31 contains words as mentioned above, such as a recorded spoken commercial announcement. To edit the tape, the user will tear away any portion of the upper tape desired to expose the spoken word sound track beneath. Then when the double tape is drawn past the stylus 42, it will follow the substantially continuous sound track, first picking up the recorded music from groove 29 of the upper tape 17, then the spoken words from groove 31 of tape 16, and finally the music again from groove 29 of the next section of tape 17. Of course, more than one section of the covering tape can be torn away so that several recorded music sections interspersed with spoken word sections will be reproduced by the sound box 41.

The edited tape carrying the substantially continuous sound track composed of successive sections of groove 29 and groove 31 will be drawn past the stylus. While a discontinuity exists in the sound track at each end of a section of the upper tape and at each end of an exposed section of the lower tape, the stylus 42 follows the substantially continuous sound track presented to it without difficulty. The covering tape is very thin so that stylus 42 passes readily from one tape section to the other. As the stylus 42 passes from one section of the sound track to the next on the successive tape sections, a slight click may be noticed as the stylus leaves the groove of one tape section and engages in the groove in the next tape section. This occurs only momentarily and is not objectionable.

The sprocket 38 and roller 39 may be interchanged with any other suitable pair of rollers so that the device may be used in connection with the existing conventional recording tape.

Figure 6:
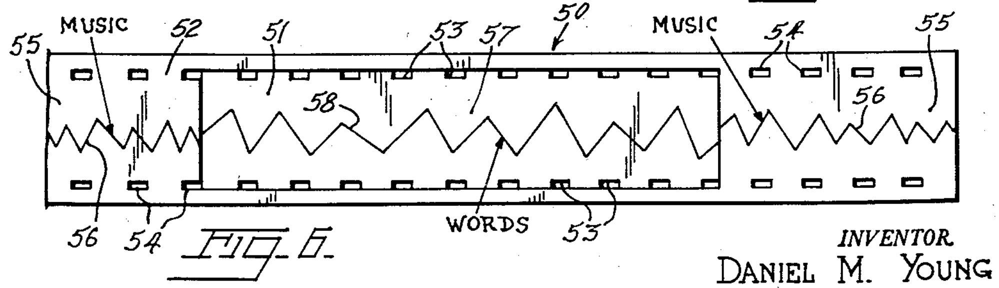
Fig. 6 is a view similar to Fig. 4 but illustrating a modification of the present invention.

The modification of the invention illustrated in Fig. 6 is characterized by the provision of a tape 50 having two separate superposed flexible tapes 51 and 52 of vinyl plastic with spaced sprocket openings 53 and 54 along the side edges. The covering tape 52 has a sound track 55 with sound groove 56 and the covered tape 51 has a sound track 57 with sound groove 58 which contain a different recording than grooves 56.

To edit the tape 50, the user of the tape needs only to sever the overlying tape 52 between the sprocket openings 54 wherever desired.

The tape 15 is shown to be housed in cartridges 60 which fit over spindles 36 and 37. Each of these cartridge members is provided with a suitable cover member 61, a guide roller 62 and a slot 63 through which the recording tape travels in passing stylus 42.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A permanent sound record medium, comprising two superposed flexible tapes each having a permanently engraved groove containing a different sound recording, each of said tapes having a plurality of sprocket openings adjacent its edges and spaced longitudinally along the tape, the sprocket openings of one tape being in registration with the sprocket openings of the other tape with projecting portions bordering the sprocket openings of the one tape engaged in the sprocket openings of the other tape, the one tape covering the other tape and the groove thereon, said one tape having longitudinally spaced transversely extending openings therein to facilitate tearing off a portion of the one tape to expose a section of the other tape so that a continuous sound track is provided consisting of at least one portion of the groove in the one tape and at least one portion of the groove in the other tape.

2. A permanent sound record medium, comprising two superposed flexible tapes each having a permanently engraved groove containing a different sound recording, each of the tapes having a plurality of sprocket engaging openings adjacent its edges spaced longitudinally along the tape, the sprocket opening of one tape being in registration with the sprocket openings of the other tape with projecting portions bordering the sprocket openings of the one tape engaged in the sprocket openings of the other tape, the one tape covering the other tape and the groove therein, said one tape being tearable to remove portions thereof for exposing sections of the other tape so that a continuous sound track is provided consisting of portions of the groove in the one tape and portions of the groove in the other tape.

References Cited in the file of this patent

UNITED STATES PATENTS

| | | |
|---|---|---|
| 1,174,069 | Hosford | Mar. 7, 1916 |
| 1,710,677 | Cawley | Apr. 23, 1929 |
| 1,771,983 | Wandel | July 29, 1930 |
| 1,792,528 | Bleyer | Feb. 17, 1931 |
| 1,973,470 | Denis | Sept. 11, 1934 |
| 2,019,474 | Bailey | Nov. 5, 1935 |
| 2,176,303 | Jones | Oct. 17, 1939 |
| 2,246,655 | Bacon | June 24, 1941 |